(12) United States Patent
Notargiacomo

(10) Patent No.: US 10,320,432 B2
(45) Date of Patent: Jun. 11, 2019

(54) APPLIANCE FOR RECEIVING RADIO FREQUENCY SIGNALS, USABLE IN PARTICULAR FOR THE MANAGEMENT OF UPLINK SIGNALS

(71) Applicant: TEKO TELECOM S.R.L., Castel San Pietro Terme (IT)

(72) Inventor: Massimo Notargiacomo, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 0 days.

(21) Appl. No.: 15/319,729

(22) PCT Filed: Jun. 15, 2015

(86) PCT No.: PCT/IB2015/054514
§ 371 (c)(1),
(2) Date: Dec. 16, 2016

(87) PCT Pub. No.: WO2015/193792
PCT Pub. Date: Dec. 23, 2015

(65) Prior Publication Data
US 2017/0149464 A1 May 25, 2017

(30) Foreign Application Priority Data
Jun. 19, 2014 (IT) .............................. MO2014A0181

(51) Int. Cl.
*H04B 1/10* (2006.01)
(52) U.S. Cl.
CPC ... *H04B 1/1036* (2013.01); *H04B 2001/1063* (2013.01)

(58) Field of Classification Search
CPC .......... H04B 1/1036; H04B 2001/1063; H04B 1/10; H04B 1/1027
See application file for complete search history.

(56) References Cited

U.S. PATENT DOCUMENTS

| 6,035,213 A * | 3/2000 | Tokuda ................ H04B 1/1036 370/441 |
| 2006/0035620 A1* | 2/2006 | Millard ................ H04B 1/1036 455/339 |

(Continued)

FOREIGN PATENT DOCUMENTS

EP 2711735 A1 3/2014

OTHER PUBLICATIONS

European Search Report dated Feb. 6, 2015 from Italian Patent Application No. MO2014A000181 filed Jun. 19, 2014.

(Continued)

*Primary Examiner* — Nguyen T Vo
(74) *Attorney, Agent, or Firm* — David B. Tingey; Bryant J. Keller; Kirton McConkie

(57) ABSTRACT

The appliance for receiving radio frequency signals, usable in particular for the management of uplink signals, comprises an input port of a radio frequency input signal, an amplification unit connected to the input port an output port connected to the amplification unit, an adjustable notch filter operatively connected to the amplification unit, a detection unit of the interference frequency of a disturbance signal of the input signal, an adjustment unit operatively connected to the adjustable notch filter and to the detection unit and able to adjust the central frequency of the adjustable notch filter on the interference frequency.

13 Claims, 3 Drawing Sheets

(56) References Cited

U.S. PATENT DOCUMENTS

| | | | |
|---|---|---|---|
| 2007/0047681 A1* | 3/2007 | Chan | H04B 1/1036 |
| | | | 375/350 |
| 2007/0153878 A1 | 7/2007 | Filipovic | |
| 2007/0262817 A1* | 11/2007 | Ciccarelli | H03F 3/72 |
| | | | 330/278 |
| 2008/0224792 A1* | 9/2008 | Nielsen | H04B 1/1036 |
| | | | 333/17.1 |
| 2013/0035050 A1* | 2/2013 | Gao | H01Q 1/243 |
| | | | 455/193.1 |
| 2013/0070875 A1* | 3/2013 | Kuan | H04B 1/0021 |
| | | | 375/340 |
| 2013/0115904 A1* | 5/2013 | Kapoor | H04B 1/1036 |
| | | | 455/234.1 |
| 2014/0106697 A1* | 4/2014 | Wang | G01S 19/21 |
| | | | 455/307 |

OTHER PUBLICATIONS

International Search Report and Written Opinion dated Aug. 21, 2015 from International Patent Application No. PCT/IB2015/054514 filed Jun. 15, 2015.

* cited by examiner

US 10,320,432 B2

APPLIANCE FOR RECEIVING RADIO FREQUENCY SIGNALS, USABLE IN PARTICULAR FOR THE MANAGEMENT OF UPLINK SIGNALS

TECHNICAL FIELD

The present invention relates to an appliance for receiving radio frequency signals, usable in particular for the management of uplink signals.

BACKGROUND ART

It is known that with reference to any type of analogue or digital receiver, the quality of the uplink is considerably limited by the presence of interference which can disturb the signal processing on the receiving chain.

The presence of a strong input signal can in fact activate the ALC (Automatic Level Control) circuit, which is responsible for automatically adjusting the signal power in order to maintain it constant even in the event of fast variations in the input signal.

This can inevitably lead to an indiscriminate reduction of the disturbed input signal or, with reference to a digital receiver, it may cause the saturation of the ADC (Analog to Digital Converter) circuit, with the consequent incorrect digitalisation of the signal.

Therefore, it is of fundamental importance to be able to efficiently cancel the interference on the uplink signal.

In particular, the filters used must necessarily have an extremely selective frequency response, in order to ensure the elimination exclusively of the part of interference relating to the uplink signal.

DESCRIPTION OF THE INVENTION

The main aim of the present invention is to provide an appliance for receiving radiofrequency signals, usable in particular for the management of uplink signals, which allows to reduce or eliminate a particular frequency from an input signal, while maintaining substantially unchanged the other frequencies within the signal spectrum.

Another object of the present invention is to provide an appliance for receiving radiofrequency signals, usable in particular for the management of uplink signals, which allows to overcome the mentioned drawbacks of the prior art within the ambit of a simple, rational, easy and effective to use as well as affordable solution.

The above mentioned objects are achieved by the present appliance for receiving radiofrequency signals, usable in particular for the management of uplink signals, according to claim 1.

BRIEF DESCRIPTION OF THE DRAWINGS

Other characteristics and advantages of the present invention will become better evident from the description of five preferred, but not exclusive embodiments of an appliance for receiving radiofrequency signals, usable in particular for the management of uplink signals, illustrated by way of an indicative but non-limiting example in the accompanying drawings, in which.

EMBODIMENTS OF THE INVENTION

Figure 1:
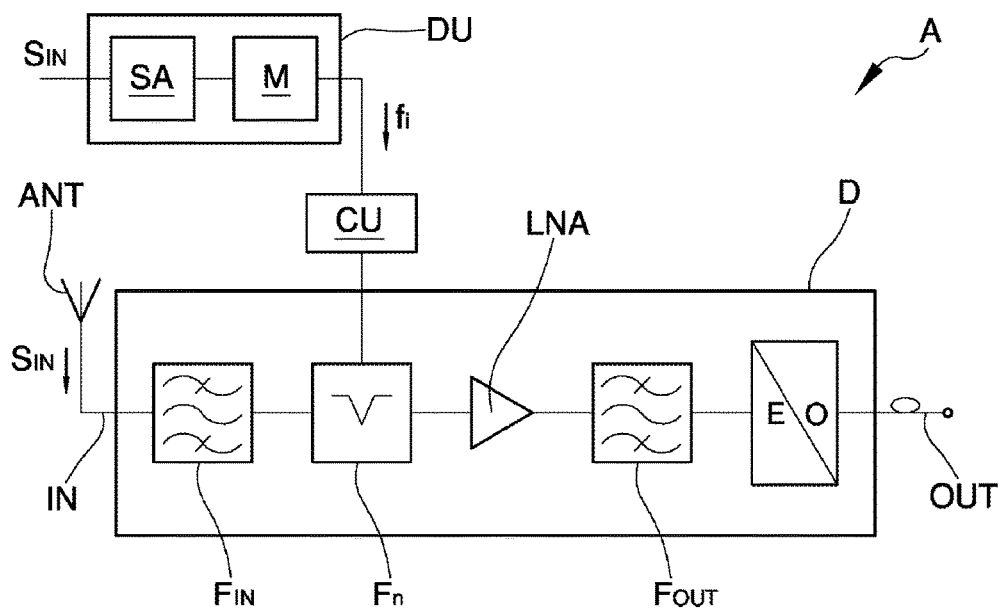
FIG. 1 is a block diagram showing a possible first embodiment of the appliance according to the invention.

With particular reference to such illustrations, globally indicated with A is an appliance for receiving radiofrequency signals, usable in particular for the management of uplink signals.

In particular, the appliance A comprises a receiver device D, the type of a Remote Unit or similar device, having an input port IN, connectable to at least an antenna ANT and able to receive a radio frequency input signal $S_{IN}$, an amplification unit LNA connected to the input port IN and an output port OUT connected to the amplification unit LNA.

Preferably, the amplification unit LNA is made up of a low noise amplifier. Advantageously, the receiver device D comprises an adjustable notch filter $F_n$ operatively connected to the amplification unit LNA.

Furthermore, the appliance A comprises a detection unit DU of the interference frequency $f_i$ of at least a disturbance signal of the input signal $S_{IN}$, and an adjustment unit CU operatively connected to the adjustable notch filter $F_n$ and to the detection unit DU and able to adjust the central frequency of the filter $F_n$ on the interference frequency $f_i$ and to adjust the bandwidth eliminated so as to eliminate the interference only, leaving unaltered the useful signal as much as possible.

In particular, the detection unit DU comprises a spectrum analyzer SA able to receive at input the input signal $S_{IN}$ and able to return at output the spectral characteristics of the input signal itself.

The detection unit DU can also comprise monitoring means M operatively connected to the output of the spectrum analyzer SA and able to determine the interference frequency starting from the spectral characteristics of the input signal $S_{IN}$.

For example, these monitoring means can be implemented by means of a suitable software programme.

In practice, therefore, the information provided by a spectrum analyzer is used to adjust the adjustable notch filter $F_n$ positioned in specific positions in the uplink chain of a receiver device D, in order to eliminate strong interference. In particular, the central frequency and the bandwidth of the adjustable notch filter $F_n$ are adjusted depending on the specific characteristics of the interference.

The spectrum analysis of the input signal $S_{IN}$ and, therefore, the detection of the interference frequency $f_i$, as well as the adjustment of the adjustable notch filter $F_n$, can be done:

manually: an operator monitors the information provided by the spectrum analyzer SA and adjusts the filter $F_n$ accordingly;

automatically: the monitoring means M, implemented by means of a suitable software programme, are used to monitor the output of the spectrum analyzer SA to identify the presence of interference and determine its characteristics.

In the second case, in particular, the interference may be detected by scanning the uplink band using different methodologies, such as:

receiving of information on interference from the Base Radio Station (Base Station—BS);

by means of an uplink signal autocorrelation function, and
by means of the recognition of a predefined scheme of interference parameters (frequency, bandwidth, etc.);
by means of the analysis of the quality level of the radio frequency signal.

The spectrum analyzer SA and the detection unit DU can be located on the Master Unit (MU) side.

Conveniently, in this case the conventional communication link already present between the Master Unit and the Remote Unit can be used to transmit information to the adjustment unit CU.

The integration of the detection unit DU and the adjustment unit CU directly on the Remote Unit (RU) side within the receiver device D cannot however be ruled out.

Advantageously, furthermore, the adjustable notch filter $F_n$ comprises a plurality of notch filters, not shown in the illustrations, with different technical characteristics and that may be combined together so as to center the central frequency on the interference frequency $f_i$ and to adjust the eliminated bandwidth so as to eliminate the interference only, leaving unaltered the useful signal as much as possible.

Specifically, the technical characteristics of the plurality of notch filters can be selected from the group comprising: narrowband, broadband, fixed bandwidth, variable bandwidth, order, central frequency.

In this way, therefore, it is possible to use the series of notch filters to obtain a notch filter centred on the specific interference frequency.

Advantageously, the adjustable notch filter $F_n$ can be positioned in two different positions along the uplink chain:
upstream of the low noise amplifier LNA;
downstream of the low noise amplifier LNA.

Referring to a first embodiment, illustrated in FIG. 1, the receiver device D is composed of an analogue Remote Unit wherein the adjustable notch filter $F_n$ is positioned upstream of the low noise amplifier LNA.

In this case, the receiver device D comprises:
an input filter $F_{IN}$, the type of a DPX filter or the like, connected to the input port IN;
the adjustable notch filter $F_n$, connected downstream of the input filter $F_{IN}$;
the low noise amplifier LNA, connected downstream of the adjustable notch filter $F_n$;
an output filter $F_{OUT}$, the type of an analogue band pass filter, connected downstream of the low noise amplifier LNA;
an electro-optic converter E/O, connected downstream of the output filter $F_{OUT}$ and upstream of the output port OUT.

In particular, the adjustable notch filter $F_n$ is arranged upstream of the low noise amplifier LNA if there is strong interference, in order to eliminate such interference and guarantee a dynamic, strong signal.

It should be noted that inserting the adjustable notch filter $F_n$ at the head of the amplification chain leads to the increase in NF (Noise Figure) equal to the IL (Insertion Loss) of the filter $F_n$. Therefore, this solution is advisable if the need to limit the noise figure NF is greater than the need to eliminate strong interference.

Figure 2:
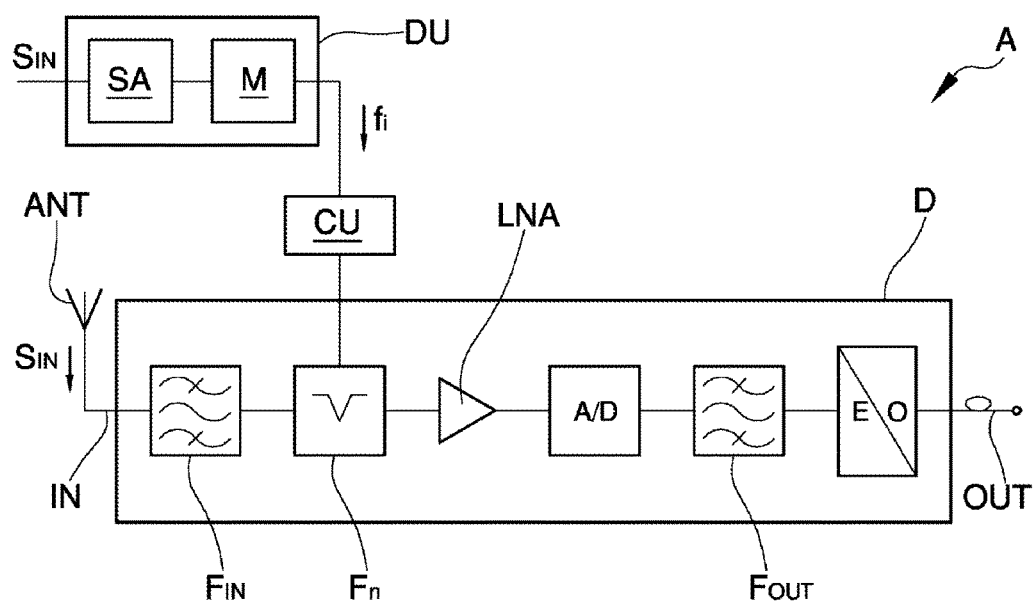
FIG. 2 is a block diagram showing a possible second embodiment of the appliance according to the invention.

With reference to a second embodiment, illustrated in FIG. 2, the receiver device D is made up of a digital Remote Unit wherein the adjustable notch filter $F_n$ is positioned upstream of the low noise amplifier LNA.

In this case, the only difference with respect to the analogue solution described above consists in the presence of an analogue/digital A/D converter connected directly downstream of the low noise amplifier LNA and in the presence of a digital output filter $F_{OUT}$ interposed between the analogue/digital A/D converter and the electro-optic E/O converter.

Figure 3:
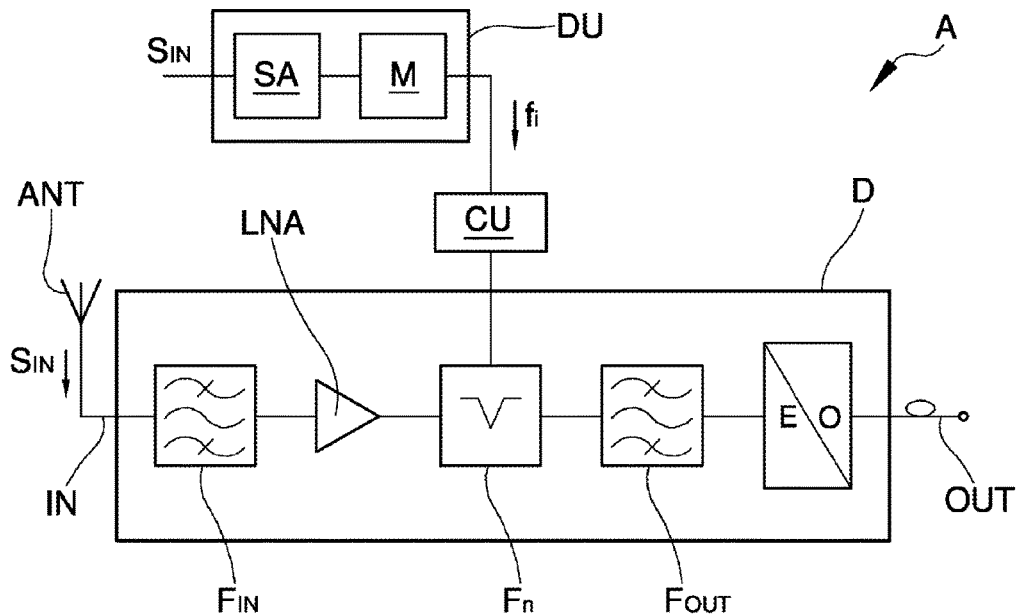
FIG. 3 is a block diagram showing a possible third embodiment of the appliance according to the invention.

With reference to a third embodiment, illustrated in FIG. 3, the receiver device D is made up of an analogue Remote Unit wherein the adjustable notch filter $F_n$ is positioned downstream of the low noise amplifier LNA, before the output filter $F_{OUT}$.

In particular, the adjustable notch filter $F_n$ is positioned downstream of the low noise amplifier LNA if the interference is present but the limitation of an acceptable NF is more important.

In this case, the good linearity of the amplifier LNA is exploited, as it is strong with low-medium power signals.

Figure 4:
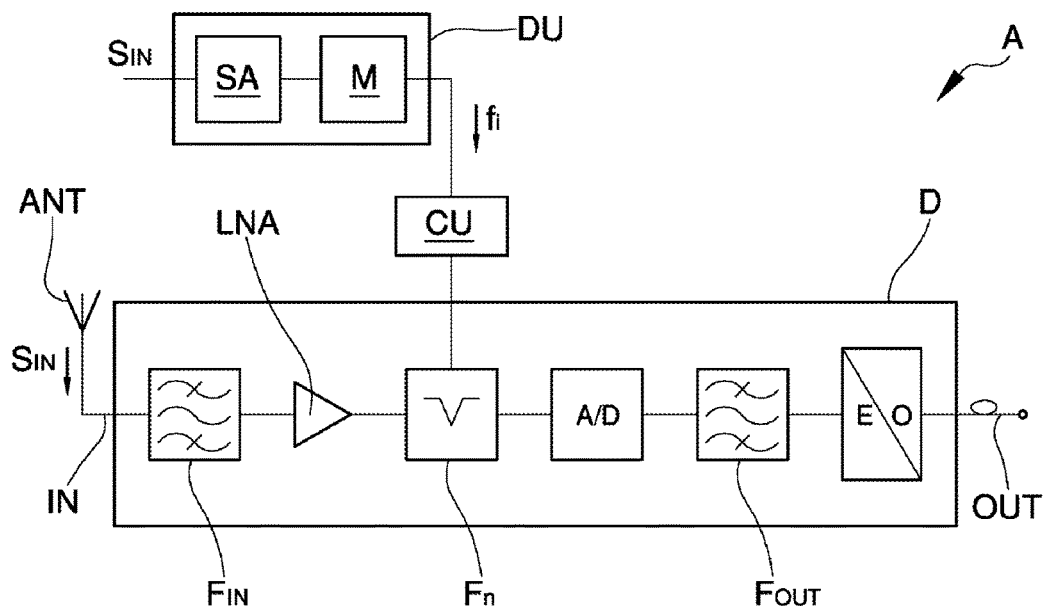
FIG. 4 is a block diagram showing a possible fourth embodiment of the appliance according to the invention.

With reference to a fourth embodiment, illustrated in FIG. 4, the receiver device D is made up of a digital Remote Unit wherein the adjustable notch filter $F_n$ is positioned downstream of the low noise amplifier LNA, before the output filter $F_{OUT}$.

In this case, the only difference with respect to the analogue solution described above consists in the presence of an analogue/digital A/D converter connected directly downstream of the adjustable notch filter $F_n$ and in the presence of an analogue output filter $F_{OUT}$ interposed between the analogue/digital A/D converter and the electro-optic E/O converter.

Figure 5:
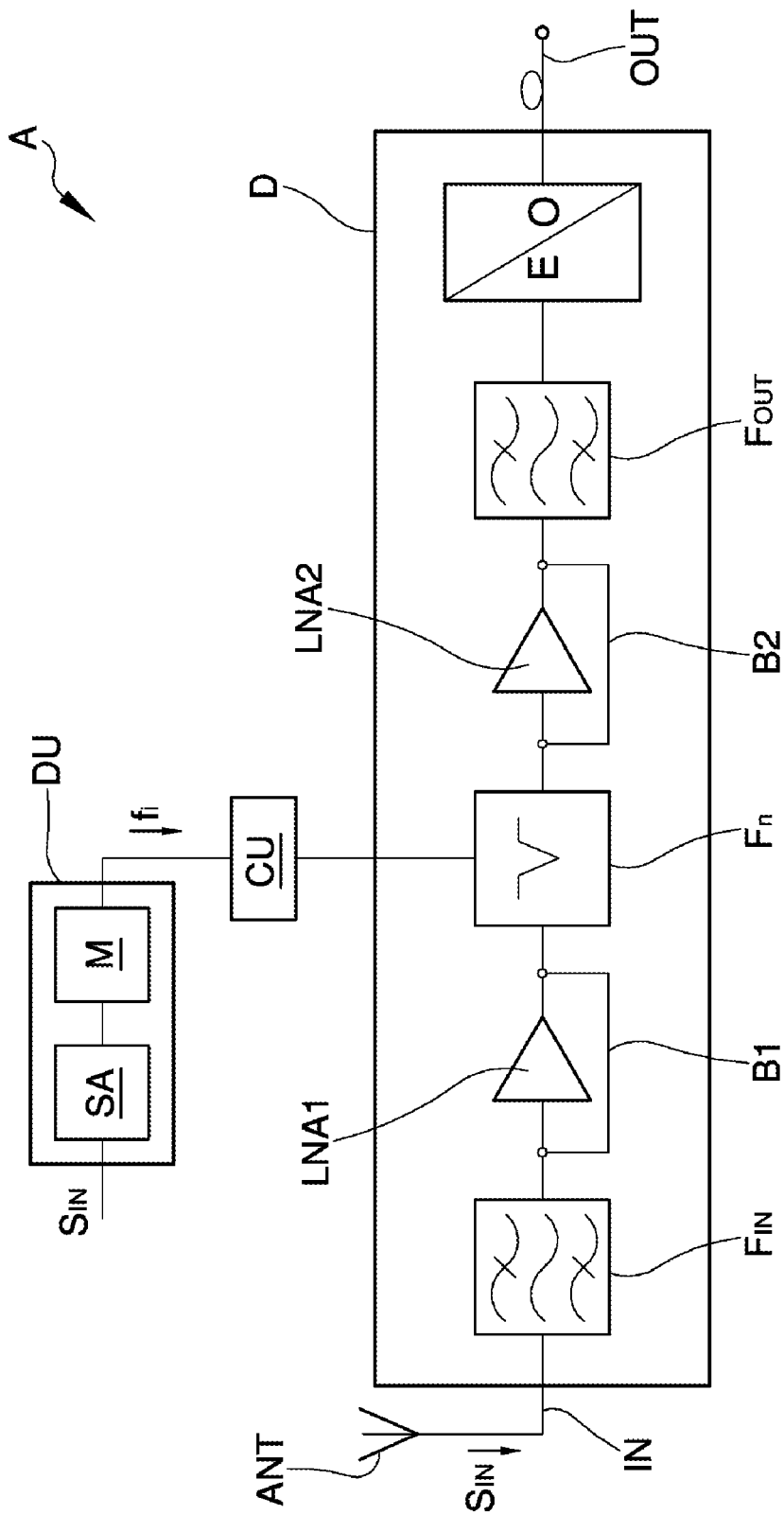
FIG. 5 is a block diagram showing a possible fifth embodiment of the appliance according to the invention.

A possible further evolution of the receiver device D, schematically shown in FIG. 5, envisages the presence of a first low noise amplifier LNA1 and of a second low noise amplifier LNA2 arranged upstream and downstream respectively, of the adjustable notch filter $F_n$ together with the use of suitable selection means between the first and second low noise amplifiers LNA1 or LNA2.

In particular, such selection means may comprise a first bypass B1 and a second bypass B2, connected to the first and to the second low noise amplifiers LNA1 and LNA2 respectively, and operable alternatively to select one or the other.

In practice, therefore, the selection of the first low noise amplifier LNA1 arranged upstream of the adjustable notch filter $F_n$ or of the second low noise amplifier LNA2 positioned downstream of the adjustable notch filter $F_n$ is made according to the compromise between the need to reduce the impact of the interference signal and the need to limit the noise figure NF.

This is the optimal solution, as it allows to limit the noise figure in the presence of low/medium power interference (inserting the adjustable notch filter $F_n$ after the amplifier LNA) and to eliminate strong interference before the amplification stage (inserting the adjustable notch filter $F_n$ before the amplifier LNA).

The operation of the appliance A according to the invention is described briefly below.

First of all, by means of the spectrum analyzer SA the presence of an interference in the input signal $S_{IN}$ is detected.

Subsequently, an operator or the monitoring means M, implemented by means of a suitable software programme, extract the interference characteristics (central frequency, bandwidth, etc.).

Consequently, an operator or the adjustment unit CU, implemented by means of a suitable software programme, adjust the series of notch filters to obtain an adjustable notch filter $F_n$ set to the specific characteristics of interference.

It has in practice been ascertained how the described invention achieves the proposed objects.

In particular, the fact is underlined that the use of the adjustable notch filter allows to reduce or eliminate a particular frequency from an input signal, at the same time maintaining the other frequencies within the signal spectrum substantially unchanged.

The invention claimed is:

1. An appliance for receiving radio frequency signals, comprising:
    an input port of a radio frequency input signal;
    a first amplification unit connected to said input port;
    a second amplification unit connected to said input port;
    an output port connected to said first amplification unit and said second amplification unit;
    an adjustable notch filter operatively connected to said first amplification unit and said second amplification unit, wherein said adjustable notch filter is arranged upstream of said second amplification unit so as to be configured to eliminate strong interference in said radio frequency input signal, and wherein said adjustable notch filter is arranged downstream of said first amplification unit so as to be configured to limit a noise figure of said radio frequency input signal;
    a first bypass connected to said first amplification unit;
    a second bypass connected to said second amplification unit, wherein said first bypass and said second bypass are operable to alternatively select said first amplification unit or said second amplification unit;
    a detection unit of an interference frequency of a disturbance signal of said input signal, wherein said detection unit comprises a spectrum analyzer able to receive at input said input signal and able to return at output spectral characteristics of said input signal and a monitoring unit operatively connected to said spectrum analyzer to receive said spectral characteristics and able to determine said interference frequency starting from said spectral characteristics of said input signal; and
    an adjustment unit operatively connected to said adjustable notch filter and to said detection unit and able to adjust a central frequency of said adjustable notch filter on said interference frequency.

2. The appliance according to claim 1, wherein said adjustable notch filter comprises a plurality of notch filters with different technical characteristics, said plurality of notch filters adaptable to be combined together so as to adjust said central frequency of said adjustable notch filter obtained from said interference frequency and so as to adjust an eliminated band to only a band of said disturbance signal.

3. The appliance according to claim 2, wherein said technical characteristics of said plurality of notch filters are selected from a group consisting of: narrowband, broadband, fixed bandwidth, variable bandwidth, order, central frequency, and a combination thereof.

4. The appliance according to claim 1, wherein said first amplification unit comprises a low noise amplifier.

5. The appliance according to claim 1, comprising an analog/digital converter connected to said output of at least one of said first amplification unit, said second amplification unit, and said adjustable notch filter.

6. The appliance according to claim 1, wherein selection of said first amplification unit is configured to eliminate strong interference in the radio frequency input signal, and wherein selection of said second amplification unit is configured to limit the noise figure of the radio frequency input signal.

7. The appliance according to claim 1, wherein said second amplification unit comprises a low noise amplifier.

8. A receiver device for receiving radio frequency signals, comprising:
    an input port of a radio frequency input signal;
    a first amplification unit connected to said input port;
    a second amplification unit connected to said input port;
    an output port connected to said first amplification unit and said second amplification unit;
    a first bypass connected to said first amplification unit;
    a second bypass connected to said second amplification unit; and
    an adjustable notch filter operatively connected to said first amplification unit and said second amplification unit and adjustable depending on an interference frequency of a disturbance signal of said input signal, said adjustable notch filter configured to receive said interference frequency without said input signal having previously passed through said adjustable notch filter,
    wherein said adjustable notch filter is arranged upstream of said second amplification unit so as to be configured to eliminate strong interference in said radio frequency input signal,
    wherein said adjustable notch filter is arranged downstream of said first amplification unit so as to be configured to limit a noise figure of said radio frequency input signal, and
    wherein said first bypass and said second bypass are operable to alternatively select said first amplification unit or said second amplification unit.

9. The appliance according to claim 8, wherein said first amplification unit comprises a low noise amplifier.

10. The appliance according to claim 8, wherein said second amplification unit comprises a low noise amplifier.

11. A receiver device for receiving radio frequency signals, comprising:
    an input port of a radio frequency input signal;
    a first amplification unit connected to the input port;
    a second amplification unit connected to the input port;
    an output port connected to the first amplification unit and the second amplification unit;
    a first bypass connected to the first amplification unit;
    a second bypass connected to the second amplification unit; and
    an adjustable notch filter operatively connected to the first amplification unit and the second amplification unit,
    wherein the adjustable notch filter is arranged upstream of the second amplification unit so as to be configured to eliminate strong interference in the radio frequency input signal,
    wherein the adjustable notch filter is arranged downstream of the first amplification unit so as to be configured to limit a noise figure of the radio frequency input signal, and
    wherein the first bypass and the second bypass are operable to alternatively select the first amplification unit to eliminate strong interference in the radio frequency input signal, or the second amplification unit to limit the noise figure of the radio frequency input signal.

12. The device according to claim 11, wherein said first amplification unit comprises a low noise amplifier.

13. The device according to claim 11, wherein said second amplification unit comprises a low noise amplifier.

* * * * *